Oct. 9, 1951  W. S. TANDLER ET AL  2,570,405
SYSTEM FOR CONTROLLING THE OPERATION
OF MACHINING AND CUTTING DEVICES
Filed May 2, 1945  6 Sheets-Sheet 1

INVENTOR
WILLIAM S. TANDLER
DAVID S. WALKER
BY
their ATTORNEYS

Oct. 9, 1951 W. S. TANDLER ET AL 2,570,405
SYSTEM FOR CONTROLLING THE OPERATION
OF MACHINING AND CUTTING DEVICES
Filed May 2, 1945 6 Sheets-Sheet 6

INVENTOR.
WILLIAM S. TANDLER
DAVID S. WALKER
BY
their ATTORNEYS.

Patented Oct. 9, 1951

2,570,405

UNITED STATES PATENT OFFICE 2,570,405

SYSTEM FOR CONTROLLING THE OPERATION OF MACHINING AND CUTTING DEVICES

William S. Tandler and David S. Walker, New York, N. Y., assignors to Industrial Scientific Company, New York, N. Y., a corporation of New York Application May 2, 1945, Serial No. 591,620

13 Claims. (Cl. 266—23)

1

This invention relates to improvements in devices for use in automatically controlling manufacturing operations. It relates more particularly to improvements in photoelectric cell devices of the type disclosed in our application, Serial No. 461,404, filed October 9, 1942, now Patent No. 2,438,098, dated March 16, 1948, which are used to control the operation of machining or cutting devices such as, for example, flame cutting apparatus provided with oxy-acetylene torches and the like.

In our Patent No. 2,438,098, we disclosed a control mechanism whereby a desired outline or pattern could be produced or approximated by the movement of a cutting device such as a cutting torch along rectangularly related coordinates. Thus, in the cutting of steel plates it was possible to cut on a line inclined at an angle to both of the coordinates by causing the torch to follow a zig-zag path along the line by alternate operation of two motors which drove the torches. Control of the motors was obtained by means of record drums provided with indicia or marks thereon that could be detected by means of photoelectric cells for generating power impulses for starting and stopping the two motors.

An object of the present invention is to provide a photoelectric control device that is capable of a greater rate of production than the device described generally above.

A further object of the invention is to provide a more flexible control system whereby a greater variety of patterns can be produced and whereby these patterns can be cut in different positions without change of the control records.

A further object of the invention is to provide a photoelectric control device generally of the type described above which has a higher productive capacity in a relatively smaller area.

A further object of the invention is to provide a system whereby a more positive control over the operation of the device is attained and unwanted stoppages in the operation of the device are avoided.

A further object of the invention is to provide a more positive connection between the operating motors and the control charts so as to assure closer synchronization between the operation of the motors and the movement of the pattern-making elements.

A further object of the invention is to provide an improved electrical control system whereby the direction of operation of the system can be inverted to cut mirror image patterns without change in the control records.

Other objects of the invention will become apparent from the following description of typical forms of devices embodying the present invention.

In accordance with the present invention, the control mechanism may include two motor driven drums for receiving control charts or records that control the starting and stopping of the motors and two additional motor driven drums for receiving charts or control records that control the direction of rotation of the electric motors. One of the motors is connected through suitable gearing to a rack which moves transversely of a supporting carriage, this rack being so arranged that a plurality of cutting torches or other cutting or machining devices may be moved laterally thereby to produce a plurality of patterns on opposite sides of the carriage. Thus, in accordance with the present invention, it is possible to cut or otherwise form 1, 2, 3, 4 or more duplicate patterns on each side of the machine, thereby greatly increasing its capacity without materially increasing the space required for operation of the device.

The torch or torches are also movable at a right angle to the direction of movement of the rack by means of the second motor which drives the carriage along a guide rail. This second motor is directly coupled through suitable reduction gearing to one of a pair of drums for receiving a record chart for stopping the carriage moving motor and the starting motor that drives the rack. Also driven by the carriage operating motor is a second drum carrying a reversal record which inverts or reverses the direction of its associated motor.

The indicia on the various charts or control records are sensed by means of a suitable photoelectric cell which in turn controls the operation of the two motors through an electrical system.

A novel feature of the electrical system is the provision of switching mechanism which permits the reversal of the direction of either or both of the motors in order to obtain an inversion of the cutting or tracing operation whereby mirror images or inverted images of a desired object can be produced without changing the charts.

The invention further includes a novel apparatus for preparing control records whereby a given interval may be divided into an equal number of parts or whereby the interval may be divided accurately into increments of a desired length. This device is particularly useful for preparing charts when only a few control points at which changes in direction of the cutting or tracing mechanism are known. The dividing mechanism permits the intervals between the known control points to be divided into a suitable number of control points of such spacing that the torch or other cutting or machining tools can be moved to produce either a rough approximation of the pattern or a close approximation, depending upon requirements.

For a better understanding of the present invention, reference may be had to the accompanying drawings in which.

The invention will be described with relation to a flame cutting device, although it will be understood that the control system is useful for many operations other than flame cutting. The form of the invention illustrated includes a carriage 10 on which are mounted the flame cutting torches or similar cutting devices 11a, 11b, 11c, 11d, which are supplied with the gases whose combustion provides the high temperature cutting flame through hoses 12 from sources, not shown. Each torch is mounted on a carrier 14a, 14b, 14c, 14d slidable lengthwise of the booms or arms 17a, 17b extending from opposite sides of the carriage 10. The booms 17a and 17b are fixed to the carriage 10 and serve as supports along which the carriers are moved as described below. Only the torch carriers 14a and 14c are directly driven through connectors 15a and 15b by means of the transverse rack bar 16 slidably mounted on the carriage 10 for endwise movement, the transverse rack 18 and the pinion 19. The torch carriers 14b and 14d are driven by means of the connecting rods 13a and 13b from carriers 14a and 14c. The connecting rods 13a and 13b may be made of any desired length depending upon the spacing between the carriers that may be required for cutting the several pieces or patterns. The connecting rods may be replaced at any time except when the machine is in operation to vary the spacing between the several carriers. Any number of carriers up to a number compatible with the mounting space on the arms may be driven by means of additional connecting rods whereby a plurality of identical shapes may be cut in one operation.

The pinion 19 is connected by means of the shaft 20 and gear box 21 to the motor 22 which is mounted on the carriage 10.

Also driven by motor 22 (Figure 2) through gear box 21, interchange gear box 25 and the electromagnetic reversing clutch 26 are the rotatable control cylinders 27 and 28 adapted to carry control records 29 and 30 which control the operation of the torches in the manner as described hereinafter. In this way, the control cylinders 27 and 28 rotate in synchronism with the movement of torches 11a, 11b, 11c and 11d, all being driven by motor 22.

The clutch 26 is adapted to reverse the direction of rotation of the drums 27 and 28 with respect to the motor 22, depending on which one of two control solenoids, not shown, is energized as described later.

The control cylinders 27 and 28 (Figure 1) are rotated by shafts 31 and 31a carrying keys 32 and 33. At the same time they move axially on the screw threads 34 and 35 (Figure 2) so that a helical path will be traced by any point on the control cylinders.

The cooperating photoelectric scanners include the light sources 36 and 37 that project the light spots on the cylinders 27 and 28, and the photoelectric cells 38 and 39 that detect light reflecting marks in the records and convert them into corresponding current impulses. The cables 40 and 41 connect the cells 38 and 39 respectively to the electrical control box 42, for which the electrical circuit is shown in greater detail in Figures 6A and 6B.

Due to the longitudinal displacement and the rotation of control cylinders 27, 28, any point on the same describes a helical path and all points on the cylinders pass successively in front of the scanners which differentiate between the control marks made, for instance, of a light reflecting substance such as aluminum paint and the residual surface of the record which is preferably made of a black non-reflecting material.

When traveling in the normal speed range of 10 to 20 inches per minute, the motor 22 has sufficient overtravel to insure that the light spot will be completely or almost completely off the control mark, at least far enough for the safety device, to be described subsequently, to function properly. However, at lower speeds the light spot may remain on a control mark at a reversal point for a considerable period of time due to the fact that at a low operating speed a comparatively long time is required for the play to be taken out of the drive gears.

If sufficient inertia is introduced into the motor 22 so that it will not stop short but will overtravel sufficiently that the control mark will be cleared in every case, interference on travel reversals will be eliminated. Such an adjustable inertia may be introduced into the device by means of the adjustable flywheel 24 (Figure 1) attached to the shaft of the motor 22 and having the weights 24a that may be adjusted radially to vary the inertia introduced into the system.

To effect the longitudinal displacement of the torches 11a to 11d, the carriage 10 is provided with the lateral guide rollers 44 and 44a, and the rollers 45, cooperating with fixed rails 46 and 47, whereby carriage 10 may be readily moved along rails 46 and 47. Rollers 44 and 44a are separated by spacer 48, so that the distance between the rolling faces is constant thus preventing any lateral motion relatively to the rail 46. In this manner the machine is guided positively from one rail, so that only one rail need be accurately aligned in a longitudinal direction.

The motive power for carriage 10 is provided by a second motor 49 which drives by means of a gear box 52, a pinion 50 (Figure 2) engaging a fixed rack on the cog-rail 51. Accordingly, the operation of the motor 49 will produce rotation of pinion 50, which will drive the carriage 10 along rails 46 and 47. The motor 49 is provided with a plugging switch 53, the purpose of which will be described hereinafter.

A second pair of control cylinders 54 and 55, carrying helical control records 56 and 57, is driven by the motor 49 in synchronism with the movement of carriage 10 and consequently also with the longitudinal displacement of torches 11a, 11b, 11c, 11d, through gear box 52 (Figure 2), interchange gear box 25 and electromagnetic reversing clutch 58 which is identical to clutch 26.

The control cylinders 54 and 55 (Figure 1) are rotated by the shafts 59 and 59a and keys 60 and 60a in a manner described in connection with control cylinders 27 and 28. These cylinders cooperate with photoelectric scanners comprising the light sources 61 and 62 for projecting a light spot on the cylinders and the photoelectric cells 63 and 64 that convert the marks on the records into corresponding current impulses. The cells 63 and 64 are connected by cables 65 and 66 to the electrical control box 42.

Connected to control box 42 by cable 67 are the motors 22 and 49, which are thereby controlled by the drums or cylinders 27, 28, 54 and 55, to cause torches 11a, 11b, 11c and 11d to trace any desired outline in a manner similar to that disclosed in our Patent No. 2,438,098.

Devices embodying the present invention are provided with a novel electrical control system which inverts the direction of cut in either the longitudinal or transverse direction or both.

Figures 2, 4, 5:
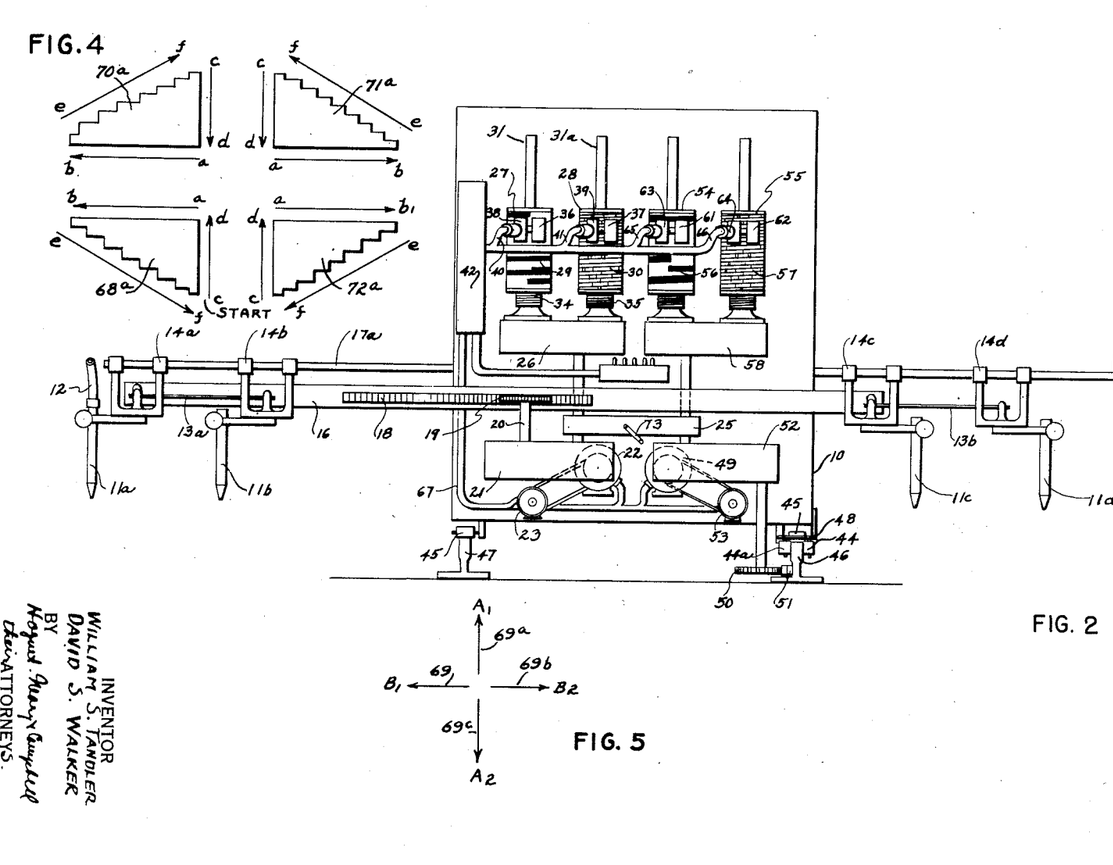
Figure 2 is a view in end elevation of the device also partly broken away to disclose details thereof.

To explain the operation of this inversion device reference is had to the diagram of Figure 5 in which the direction of the longitudinal displacement of the torches is represented by arrows $A_1$ and $A_2$ and the transverse displacement of the torches by arrows $B_1$ and $B_2$. For simplicity, the directions of displacement and the corresponding motors which produce these motions will be termed the A and B directions and the A and B motors (motors 49 and 22, respectively).

Figures 1, 3:
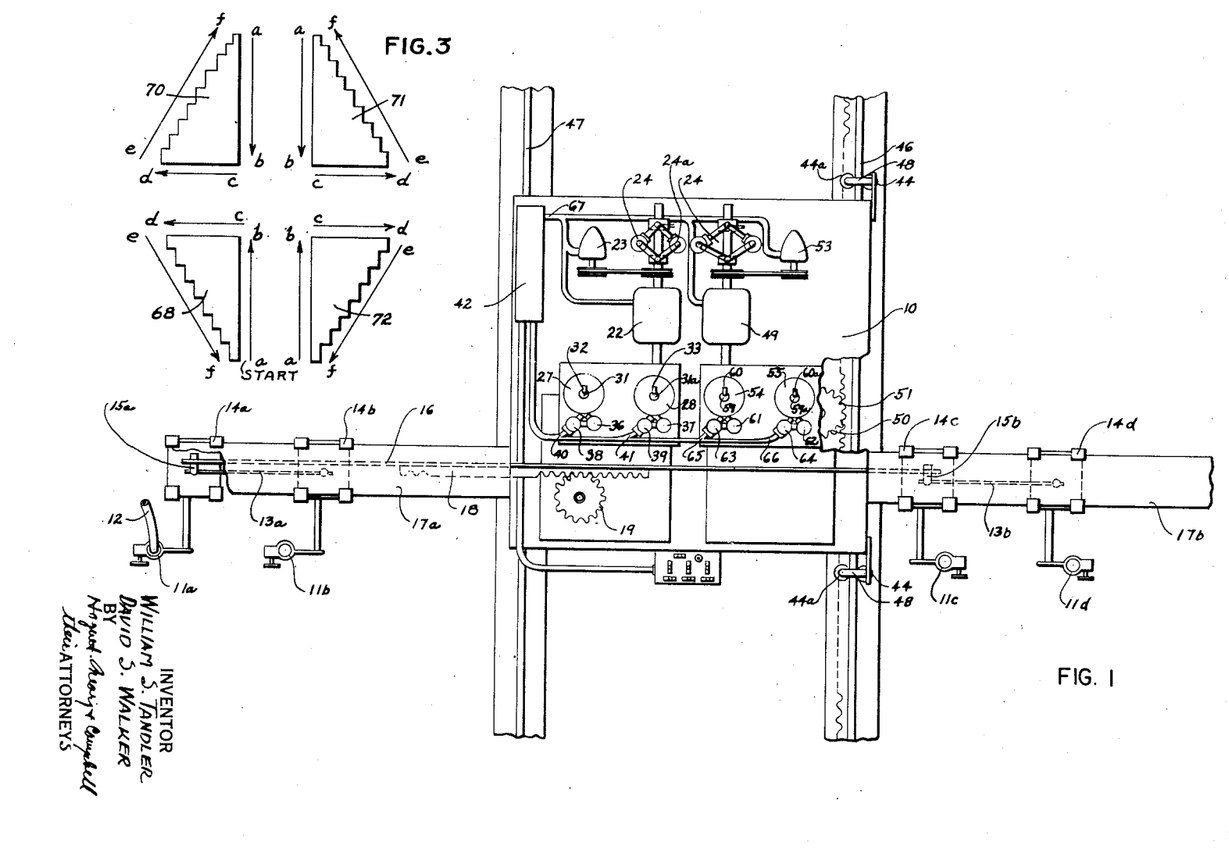
Figure 1 is a plan view partly broken away of a typical form of control mechanism embodying the present invention.
Figures 3, 4 and 5 are diagrammatic showings of typical patterns that may be traced or produced with the devices disclosed in Figures 1 and 2.

If it be desired that the torches cut out the piece 68, $a$, $b$, $c$, $d$, $e$, $f$ of Figure 3, starting from point $a$, the A motor and B motor are alternately energized to cause the torches to trace the outline. Thus normal operation is indicated by arrows $A_1$ 69a and $B_1$ 69 and reverse direction by $A_2$ 69c and $B_2$ 69b.

The operation of the present device differs somewhat from the device described in Patent No. 2,438,098 in that the direction record and the reversal record for controlling the A motor (motor 49) are carried on two separate drums 54 and 55 (Figure 2), thus making for greater flexibility and ease of operation.

Should it be desired to repeat the outline of the piece 68, with the exception that it be juxtaposed as shown in 70, the operation can be carried out without change in the control records. This is accomplished by means of the switch 75 (Figure 6A), having the blades 76, 77, 78, 79, which has the effect of changing the sense of the reversing record, so that normal direction of the motor A is obtained when the photocell 64 scanning the A reverse record 57 senses "white" instead of "black," which is usual, and reverse operation of the motor A when the photocell senses "black" instead of "white." Consequently for piece 70 (Figure 3), if cutting starts at $a$, the normal operation would guide the torch to $b$, $c$, $d$, $e$ and $f$; thus $A_2$ 69b become reverse directions.

Should it be desired to cut the piece 72 in the position shown, this would require the operation of a switch 80 (Figure 6A) having the blades 81, 82, 83, 84 which have the effect of reversing the sense of the reversal control record 30 for the B motor (motor 22); that is, "white" on the reversal drum would mean normal operation and "black" would result in reversal of motor B. The normal operational directions are shown by the arrows $A_1$ 69a and $B_2$ 69b, and the reverse directions are indicated by the arrows $A_2$ 69c and $B_1$ 69 (Figure 5). In a like manner it is possible to interchange the sense of the reversal control drums for both the A and B motors simultaneously, resulting in cutting the outline of the piece 71, by the operation of switches 75 and 80.

Furthermore, the pattern can be turned through 90 degrees without change in the control records by means of handle 73, Figure 2, which acting on the gears in gear box 25, connects the control drums 54 and 55, that normally control the longitudinal displacement of the torches to motor 22 by means of the electro-magnetic reversing clutch 58 and the transverse displacement control cylinders 27 and 28 by means of the reversing clutch 26, to motor 49.

This interchange results in cutting the outline in the position shown in Figure 4 as a result of the control of the longitudinal motion by the control records for transverse displacement and the control of the transverse motion by the control records for longitudinal displacement. This results in cuts in which the piece 68a represents the pattern produced by normal cuts in both longitudinal and transverse directions. The control system can be inverted further to produce the piece 70a that represents inverted longitudinal cuts and normal transverse cuts, the piece 71a that represents the cut resulting from inversion in both directions, and the piece 72 that is produced by a normal longitudinal cut and an inverted transverse cut.

In this manner, the torches 11a, 11b, 11c, 11d may be automatically controlled to execute any desired outline or curve by alternate operation of the two motors, each serving to stop itself and to start and reverse the other, under the control of their forward and reversal records and also to execute these outlines or curves in any desired juxtaposition in relation to the material being cut without any change in the control records.

Figure 6A:
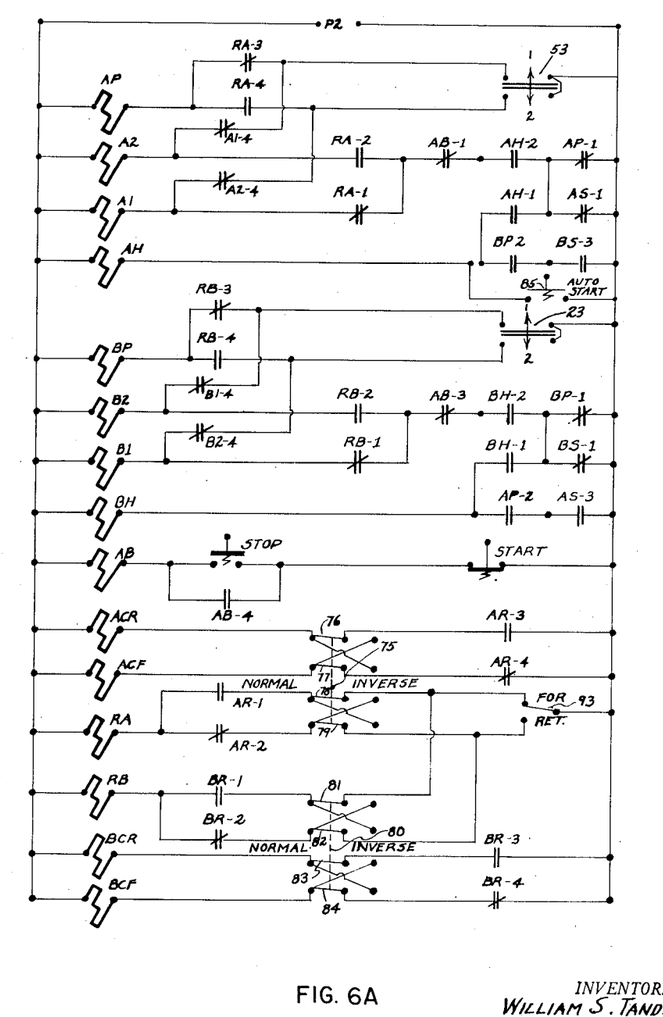
Figures 6A and 6B are schematic wiring diagrams of the electrical system of the device.
Figure 6B:
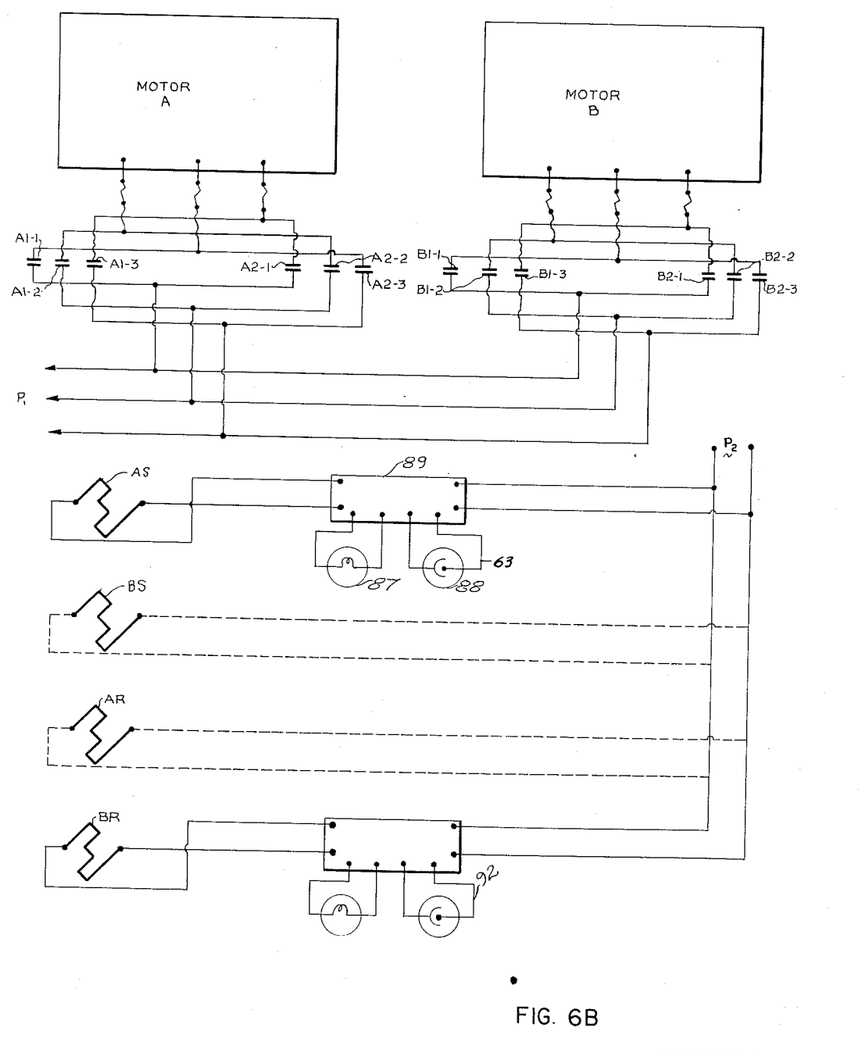

Figures 6A and 6B show the complete wiring diagram of the automatic control system for the torches in the de-energized condition, wherein all relay contacts are open except those designated by a diagonal line therethrough.

Considering first motor A (motor 49) effecting the longitudinal displacement of the cutting torches, it will be seen that motor A is adapted to be driven in a forward or reverse sense from a power source shown as a three-phase power line $P_1$, depending upon whether its relay contacts A1–1, A1–2, A1–3 or A2–1, A2–2, A2–3 (Figure 6B) are closed by their respective forward and reverse motor control relay coils $A_1$ or $A_2$ (Figure 6A). A similar forward or reverse control of the motor B (motor 22) producing the lateral or transverse motion of the torches is provided by contacts B1–1, B1–2, B1–3, and B2–1, B2–2, B2–3 (Figure 6B) of the B motor control relays B1 and B2 (Figure 6A).

The starting of the cutting procedure has been described in detail in Patent No. 2,438,098 and need not be repeated herein. After the initial adjustments have been made, the automatic operation start switch 85 (Figure 6A) is closed energizing the motor A holding relay AH (Figure 6A) to close its contacts AH–1 and AH–2. Since contact AS–1, the function of which is described later, is normally closed in the absence of energization of its relay coil AS, the closing of contact AH–1 closes a holding circuit which maintains relay AH energized even though the start switch 85 is released. The switch 85 may be of the momentary contact type.

The closing of contacts AH–2 serves to energize the forward motor control relay A1 through the normally closed contacts AP–1, AB–1 and RA–1.

The energization of relay A1 by contacts AH–2 starts the operation of the armature of the A motor in the forward direction by closing the contacts A1–1, A1–2, A1–3 and thereby connecting motor A to the line P1 for forward rotation. At the same time, the contacts A1–4 are opened. As motor A approaches normal operating speed of rotation, the plugging switch 53 driven by the motor A closes its contacts, thereby energizing the relay AP through normally closed contact RA–3 with the resultant opening of contact AP–1. As will be seen, the contacts A1–4 control the application of a braking action to motor A by plugging. The relays A1 and A2 are preferably interlocked so that only one can operate at a time.

The forward rotation of the A motor and its control drum proceeds until the A direction control scanner 63 (Figure 6B) cooperating with the A direction control record 56 (Figure 2) on the A direction control drum 54, senses a mark preferably in the form of a light reflecting spot. The current impulse thereby produced is amplified by a suitable amplifier 89 and then actuates the A motor stop relay AS. This energization of relay AS closes its contact AS–3 and opens its contacts AS–1 (Figure 6B). This energization will be only momentary, since the marks are of a small dimension and the inertia of the system would tend to rotate the mark past the scanner before being stopped.

Since switch AP–1 is now open, the opening of contact AS–1 engages the A motor holding relay AH, which drops out, thereby opening its contacts AH–1 and AH–2. Inasmuch as the start switch 85 is no longer closed, the relay AH will be kept de-energized, since its holding contacts AH–1 are opened, even though contacts AS–1 and AP–1 should again be closed.

The opening of contacts AH–2 also de-energizes relay A1, and inasmuch as these contacts are in series with the circuit of relay A1, the latter drops out and de-energizes the motor A. The opening of contacts AH–1 assures that this circuit will remain open, as a result of the de-energization of relay AH, even though relay AS should not stay energized due to the scanner moving past the control mark. Contacts AH–2 thus insure that relay A1 will remain de-energized thereafter.

The plugging switch 53 is responsive to rotation of motor A; it closes the contacts for a forward rotation of motor A so long as the motor continues to rotate above a predetermined speed. This switch may be of the type commercially known as the General Electric Plugging Switch type CR 2962A. Hence, after relay A1 has been de-energized, reclosing its contacts A1–4, energy is supplied to relay A2, which thereby exerts reverse power on motor A, so as to brake the motor to a standstill. As the motor reaches low speed, the switch 53 falls out, whereby relay A2 is de-energized and reverse rotation of the motor is prevented, so that the motor stops with only a slight overrun. The contacts A1–4 prevent operation of the relay A2 until after relay A1 has opened.

The momentary energization of relay AS also closes its contacts AS–3 which, acting through contacts AP2 which remain closed until the plugging switch 53 drops out, thereby de-energize relay AP and energize the holding relay BH for the motor B. The energization of relay BH results in closing of contacts BH–1 and BH–2. The closing of contacts BH–2 energizes the forward control relay B1 for the motor B through normally closed contacts BP1, AB–3, and RB–1.

The energization of the relay B1 starts the forward rotation of the B motor by closing contacts B1–1, B1–2, B1–3; also contacts B1–4 are opened, thereby causing the relay B2 that controls the reverse movement of motor B to become inoperative in so far as the plugging circuit is concerned.

However, as previously mentioned, the energization of relay AS and hence the closing of contacts AS–3 may be only momentary since the holding relay BH retains its energization through the contact BH–1 and the normally closed contact BS–1 even after the contact AS–3 has been opened, thus maintaining the energization of the motor control relay B–1 through contact BH–2 and the normally closed contacts BS–1, AB–3, RB–1. The contacts BH–1 serve as a holding circuit to maintain relay BH energized despite de-energization of the amplifier operated relay AS. Contacts BH–2 serve as a holding circuit for relay B–1 to insure continued rotation of the B motor.

In this manner, the A motor is rapidly stopped and the B motor starts to drive the cutting torches in a direction at right angles to provide a further increment to the desired outline or curve.

Rotation of the B motor also drives the control cylinders 27, 28 (Figure 2) for the motor B (motor 22) in a forward direction. This operation continues until a control mark on the control record 29 on the cylinder 27 is intercepted by the corresponding scanner, whereupon the relay BS is energized, at least momentarily, to close its contacts BS–3 and open the contacts BS–1.

The function of the relay BS is similar to that of the relay AS. In brief, the motor control relay B1 is de-energized, and the B plugging circuit is conditioned to be operated by the plugging switch 23, similar to switch 53, to instantly stop the motor B. In addition, the holding relay BH is de-energized to fall out and thus to keep the B1 relay de-energized even after the relay BS falls out. Also, the BS relay permits energization of the A holding relay AH and the control relay A1 for the motor A to initiate and maintain forward rotation of the A motor. The action is entirely similar to that of the corresponding A relay AS, merely reversing the A and B directions.

If, in the absence of relays AP and BP and contacts AP1-2, BP1-2, the A motor should have been previously stopped before the mark on the A distance control record had completely passed out of the pick-up zone of its associated photoelectric cell, the relay AS would have remained energized throughout the period of operation of the B motor while the A motor was stationary. Such a condition would result in contacts AS-1 remaining open. As a result, the energization of relay BS and its resultant closing of contacts BS-3 would only have the effect of a momentary energization of the motor control relay A-1 through contacts BS-3, AH-1, AH-2 all of which are closed as a result of energization of relay BS and the consequent energization of relay AH and normally closed contacts AB-1 and RA-1. Since the contacts BS-3 open upon de-energization of relay BS as a result of the light reflecting mark on the B distance control record having moved out of the pick-up zone of its associated photoelectric cell, the energization of relay A-1 would be only momentary, and, as a result, it would be impossible to maintain operation of motor A even though the A holding relay AH is now energized to close the contacts AH-1 and AH-2. Inasmuch as the contacts AS-1 remain open, the cycle of operations would come to a halt.

As a safeguard against such an eventuality, the relays AP and BP are provided which are energized by the operation of plugging switches 53 or 23 respectively. These relays AP and BP have normally closed contacts AP-1 and BP-1 and normally open contacts AP-2 and BP-2. Hence, should contact AS-1 remain open as a result of having the drum stop with a control mark in position to be sensed by its associated photoelectric cell, the A forward motor control relay A1 could be energized through contacts AH-2 and normally closed contacts AP-1, AB-1 and RA-1. The contacts AH-2 have been closed as a result of the energization of relay AH through the closing of contacts BS-3 as a result of the energization of relay BS and closing of contact BP-2 by means of the operation of motor B. The inclusion of relay AP does not affect normal operation of the system inasmuch as the relay AP is energized during operation of motor A and contacts AP-1 are open and contacts AP-2 are closed. Thus the sequence of events as outlined above proceeds without interference from relay AP.

The A and B motors automatically alternate operation, each running for a period defined by the interval between marks on the distance control record of its corresponding distance control cylinder. However, the starting of each of these periods is controlled by the record of the opposite distance control cylinder. Thus, the operation of each motor is initiated by a mark on the opposite drum record, and each motor is stopped by a mark on its own drum record.

As thus far described, the A and B motors operate alternately to execute the desired curve of the outline in the forward direction.

For reversing the direction of rotation the respective motors are each connected through appropriate gearing with a second or reversing control cylinder 28, 55 (Figure 2) provided with a reversing control record 30, 57 and a corresponding photoelectric pick-up or scanner unit 92 as described above which is identical to unit 53 (Figure 6B).

In the above description it has been assumed that the retrace switch 93 (Figure 6A) is in the forward position, as shown, so that relays RA and RB are de-energized. Let it further be assumed that one motor, such as the A motor, is operating and that the next operation of the B motor is to be in the reverse direction, then, just before the A stop control mark on the A distance drum actuates relay AS to stop the A motor and start the B motor, in the manner already described, a B reversing control mark 57 (Figure 2) on the A reversing control drum 55 energizes the B reversing control relay BR (Figure 6B) through the action of its corresponding scanner. This closes the contacts BR-1 and BR-3 (Figure 6A) and opens contacts BR-2 and BR-4. Contacts BR-1 energize the B reversing relay RB and thereby open its contacts RB-1 and RB-3.

In this manner the B reverse motor control relay B2 is set to be subsequently operated by the A stop B start relay AS, while the B forward motor control relay B1 becomes inoperative. Accordingly, upon subsequent stopping of the A motor and starting of the B motor, the B motor will rotate in reverse sense from its previous rotation.

Since the cylinders and motors are directly geared together to rotate in synchronism, it will be seen that reversal of the direction of rotation of a motor would also reverse the direction of rotation of the corresponding cylinders, so that the records on the cylinders would be repeated by rotation in the reverse sense. This would merely cause the torch to traverse the same increments but in reverse order of the action of the other motor. To prevent this it is necessary to reverse the relative directions of rotation of the motors and cylinders, so that the cylinders will continue to rotate in the same direction despite the fact that the motor has been reversed. This is accomplished by actuation of the BR relay (Figure 6B) which closes contacts BR-3 and opens BR-4 (Figure 6A) thereby de-energizing the B forward clutch solenoid BCF and energizing the B reverse clutch solenoid BCR to enable it to reverse the direction of rotation of the B cylinders relative to the B motor.

Since the relay BR (Figure 6B) will remain energized only so long as a reversing mark is sensed by the B reversing scanner, it will be clear that this mark may be in the form of a band extending in the direction of displacement of the reversal drum for a distance corresponding to the distance which it is desired to maintain the B motor in reverse rotation, as described above.

It will be seen that reversal of the A motor is accomplished in a similar manner by a reversing control band or strip on the B reversing cylinder, which is operated through its scanner to actuate the A reversing control relay AR (Figure 6B) to control the motor reversing relay RA (Figure 6A) and thus replace the relay A1 by the relay A2, and also to actuate the clutch solenoids ACF and AGR to reverse the drum rotation relative to the motor rotation.

In the manner described above, the A and B motors may be automatically controlled by their respective drum records to execute any desired curve or outline. By making the intervals of operation of each motor rather short, it is possible to have the cutter describe very complicated and intricate outlines with a high degree of accuracy, even though microscopically the actual path of the cutter would be a zig-zag path.

Under some conditions, as for example, when economy of metal is desired or for other reasons, it may be desirable to have the torches move so as to trace the outline $a, b, c, d, e, f$, as shown in 72 (Figure 3) instead of as in 68 which is assumed to be normal operation. The accomplishment of this object without changing the control record would require that the B motor operate in the reverse direction of rotation B2 69b (Figure 5) despite the fact that no reversal is indicated on the A reverse control drum and that the B motor operates in the forward direction B1 69 (Figure 1) when a reversal is indicated on the A reverse control record. This may be accomplished by operating switch 80 (Figure 6A) which places blades 81, 82, 83 and 84 in the inverse position. With the switch 80 in this position, the B reversing relay RB is energized through the normally closed contacts BR-2 and thereby its contacts RB-2 are closed and its contacts RB-1 are opened. In this way the B reverse motor control relay B2 is conditioned to be subsequently operated by the A stop B start relay AS, while the B forward motor control relay B1 becomes inoperative. At the same time the B forward clutch solenoid BCF is de-energized and the B reverse clutch solenoid BCR is energized as a result of the action of switch blade 84 acting through normally closed contacts BR-4. Thus, the direction of rotation of motor B has been reversed without the energization of the reversing control relay BR. Should the reversing control relay BR be energized through the action of its corresponding scanner while switch 80 is in the inverse position, it would serve to cause the motor to operate in the forward direction, as follows. The energization of relay BR results in the closing of contacts BR-1 and BR-3 and the opening of contacts BR-2 and BR-4. The opening of contacts BR-2 de-energizes the B reversing relay RB and thereby opens its contacts RB-2 and closes contacts RB-1. Thus the reversing motor control relay B2 is rendered inoperative and the energization of the A stop B start relay AS will result in the energization of the B forward motor control relay B1. The energization of the B reversing control relay BR results in the operation of the B motor in the forward direction. At the same time, the opening of contacts BR-4 and the closing of contacts BR-3 serves to de-energize the B reverse clutch solenoid BCR and to energize the B forward clutch solenoid BCF, thus assuring proper direction of rotation of the control drums relative to the direction of rotation of the B motor.

In a similar manner pattern inversion may be accomplished in the A direction through the operation of the A inversion switch 75, so that its blades 76, 77, 78, 79 take the inverse positions.

Thus it is possible to obtain the mirror image of any desired curve or outline without alteration of the control records.

Thus far it has been assumed that appropriate control records exist. The manner in which these records may be produced has been fully described in Patent No. 2,438,098. However, an improvement in the method of preparing the control records is being introduced by the invention which may be more readily understood by reference to Figures 9, 10, 11 and 12.

In scribing curves and inclined straight lines, it is often convenient to record reference points only and fill in the required number of short steps, as described in Patent No. 2,438,098. These short steps can be laid off with a divider by trial and error, but it is much more expedient to make use of a mechanism which enables the given space to be divided into the required number of equal sections.

The drum or cylinder 94 on which intervals are to be subdivided is mounted on drum holder 96. The drum holder 96 has a scribing pencil 97 associated therewith, so that suitable marks may be made on the record drum 94. The other drum holder 98 is coupled to drum holder 96 by means of a gear 103 and has a series of horizontal lines 99, placed at suitable intervals. These horizontal lines are divided by the well known principle of proportionate division into intervals ranging from the smallest desired to the largest permitted by space, depending upon the closeness of the spacing of the lines 99. The record drum 94 is fastened to its drum holder 96 by means of a key 101. The scriber pencil 97 is adjusted to coincide with the helix of the record drum 94. The drum 95 carrying the proportionate dividing device is constrained to rotate with its drum holder 98 and may be manualy rotated on its drum holder independent of drum 94. A suitable index 102 is provided which may be moved parallel to the axis of drum 95.

Should it be required to divide a given interval $h$—$k$ (Figure 11) into subintervals which are separated by a definite distance, this may be accomplished as follows. As an illustration of this operation let it be assumed that some interval on the record drum, such as $h$—$k$ (Figure 11) is to be divided into subintervals spaced as near as possible to $\frac{3}{16}$ of an inch from each other.

The record drum 94 is rotated until the scriber pencil 97 reaches the mark determining the initial point of the interval $h$—$k$. The drum 95 is then manually rotated in relation to its holder 98, the drum 94 being held fixed until the zero dividing line is at the point of the sliding index 102 and the point of index 102 is moved vertically until it rests on the horizontal line marked $\frac{3}{16}$ which meets each proportionately divided line at $\frac{3}{16}$ intervals. The record drum 94 is then moved to point $k$ determining the final point of the interval. Since proportionately divided drum holder 98 is coupled to the record drum holder 96, the drum holder 98 and the drum 95 rotate with the rotation of the record drum 94 to some point $k'$. The point of slidable index 102 is then moved to the nearest slant line to the uniformly divided line desired, which is the line divided into $\frac{3}{16}$ in this case, at point $k''$. The two drum holding mechanisms 96 and 98 are now rotated back in unison, a stop being made at each proportionate dividing line, and a mark made on the record drum 94 at each point. Points $l$, $m$ and $n$ represent the marks made by scriber 97, and points $l'$, $m'$ and $n'$ represent the points at which index 102 crossed a proportionate dividing line. In this fastion it may be possible to divide any given intervals into equal subintervals of any definite length.

As a further illustration of the operation of the device, let it be assumed that some interval on the record drum 94, such as $a$—$b$ (Figure 11) is to be divided into six equal parts. Record drum 94 is rotated until scriber pencil 97 reaches the mark determining the initial point of the interval $a$. Drum 95 is then manually rotated until the zero dividing line is at the point of sliding index 102; record drum 94 is then moved to point $b$ determining the final point of the interval. Since proportionately divided drum holder 98 is coupled to record drum holder 96, drum holder 98 rotates with the rotation of record drum 94 to some point $b'$. Sliding index 102 is then moved up or down until its point intersects the sixth proportional dividing line at some point such as $b''$. It is evident that the intersection need not be at one of the horizontal lines 99 but may be at any point between those lines, so that there is actually an infinite range in the size of the steps taken. The two drum holding mechanisms 96 and 98 are now rotated back in unison, a stop being made at each proporationate dividing line and a mark made on the record drum 94 at each point. Points c, d, e, f, g represent the marks made by scriber 97, and points c', d', e', f', g', represent the points at which the index 102 reached a proportionate dividing line. In this fashion, any desired number of equal steps between points on the record may be located without difficulty and with extreme accuracy.

The scribing mechanism just described is capable of accomplishing the division of intervals into subintervals in accordance with two different sets of requirements. First, the interval may be divided into equal subintervals of definite length; secondly, the interval may be divided into a given number of equal subintervals.

The operation of the device described above, namely, the device for automatically cutting any desired shape or outline in steps, requires that provision be made for the preparation of the control records by both methods illustrated above. For example, in Figure 3, piece 68, the interval e—f in the longitudinal direction is longer than interval e—f in the transverse direction. The length of subintervals will be determined by the smallest possible cut as governed by the mechanical limitations for the specific speed of operation being employed. The smaller of the two intervals will then be divided so that this least allowable length of subinterval will be employed. As described in previous application Serial No. 461,404, the number of intervals for the cut in the alternate direction must correspond to the number of intervals employed in obtaining the smallest allowable cut. Consequently, the smaller of the two intervals, which in this case is the interval on the transverse distance drum will be subdivided on the basis of the desired length of subintervals, as described above; however, the number of intervals will be the determining factor for the intervals on the longitudinal distance drum which, in this case, are the larger intervals.

Figure 7:
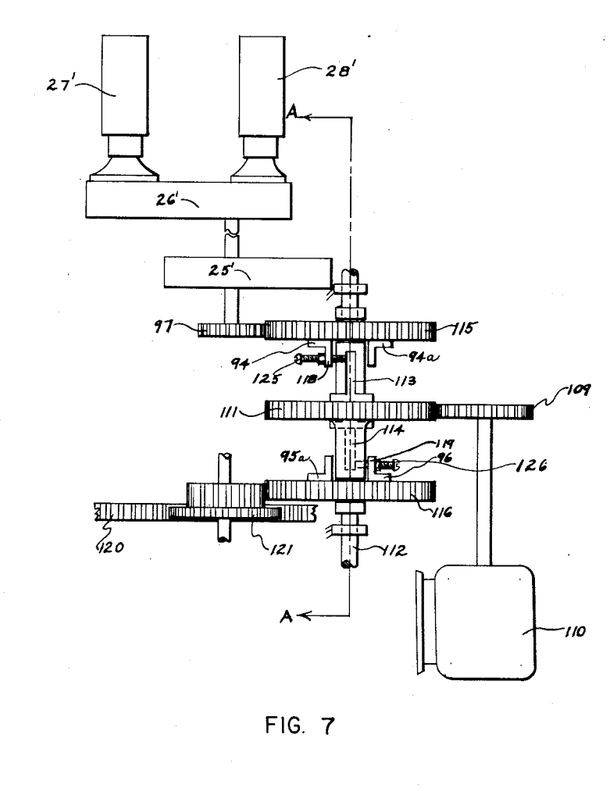
Figure 7 is a view in side elevation and partly broken away of a modified form of record control mechanism for eliminating the effects of backlash in the system.
Figure 8:
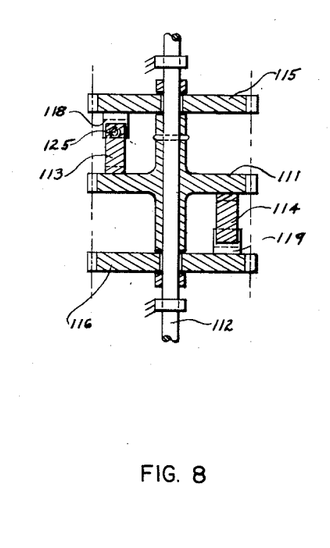
Figure 8 is a view in section illustrating a detail of the anti-backlash control.
Figure 9:
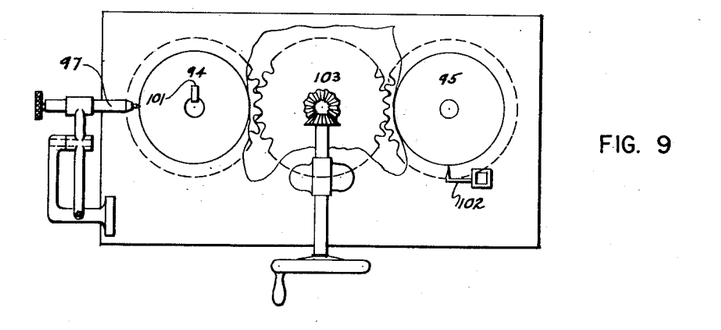
Figure 9 is a top plan view, partly broken away, of a subdividing mechanism embodying the present invention.
Figure 10:
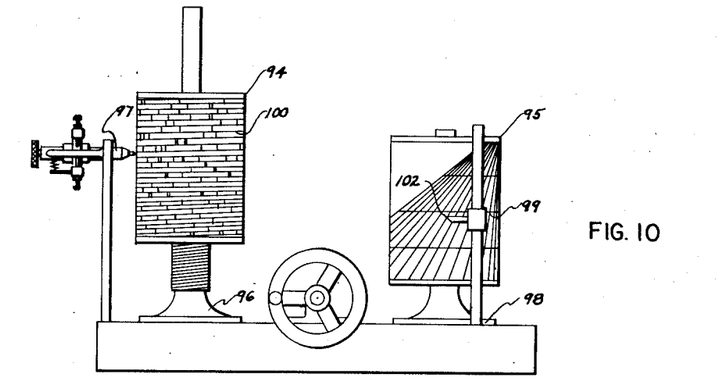
Figure 10 is a view in side elevation of the subdividing mechanism.
Figure 11:
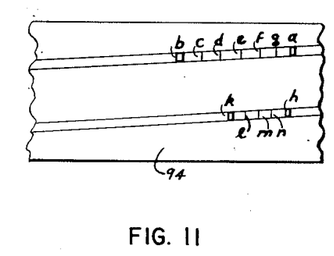
Figures 11 and 12 are views of a typical record chart subdivided by the device disclosed in Figures 9 and 10 and the chart whereby the subdivisions are made, respectively.
Figure 12:
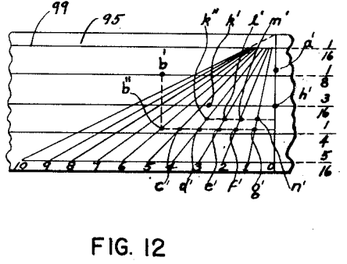

If the play or backlash in the gear train driving the drum holder mechanism is not the same as that in the gear train of the drive gear, the record drum may not start at the same instant as the corresponding torch displacement on reversal. If the displacement has been in a forward direction, then the displacement of the torches on going into reverse if there is more play in the record gear train, will commence before the drum starts moving. One method of eliminating this inequality would consist in avoiding any play in the gear trains. This condition, however, cannot be met in practice. The same result may be obtained if the play is made controllable, so that it may be equalized in the gear trains concerned. A means of obtaining this result is illustrated in Figures 7 and 8.

For both transverse and longitudinal drives the gear 109 driven by motor 110, corresponding to the motor 22, or motor B, drives gear 111 which is pinned to shaft 112. Integral with gear 111 are two driving tongues 113 and 114. Gears 115 and 116 rotate freely on shaft 117 and are driven by means of the tongues 113 and 114 and the adjustable dogs 118 and 119, which introduce a controllable amount of play or backlash.

It is apparent that any play or backlash in the mating of gears 109 and 111 will have no effect on the operation since any error thus introduced will be transmitted equally to the record mechanisms 27' and 28', through the electromagnetic clutch 26' and interchange mechanism 25', and to the corresponding drive rack 120 through gear 121.

The output of dog 118 drives the record mechanism 27' and 28' through electromagnetic clutch 26', the interchange gear box 25' and gears 122 and 123, and the output of dog 119 drives the corresponding drive rack 120 through gears 121 and 124. By means of suitable adjustment of the play in each dog, through the adjustment of the bolts 125 and 126, the backlash of the entire driving train to the record drums 27' and 28' can be made identical with the train to the rack 120 so that on reversing, the record drum starts to move at precisely the same instant that the corresponding motor begins to operate.

Since many changes can be made in the above construction and many apparently widely different embodiments of this invention can be made without departing from the invention, the embodiments of the invention described above should be considered as illustrative and not as limiting the scope of the following claims.

We claim:

1. An apparatus for forming articles of a predetermined shape comprising a carriage movable along a straight path, a motor for moving said carriage, means movably mounted on said carriage for supporting a record having light-reflecting marks thereon, means for connecting said record supporting means to said motor for movement thereby, light-sensitive means for detecting said marks, a rack mounted on said carriage for endwise movement at substantially a right angle with respect to said straight path, means for forming an article connected to and movable with said rack, a second motor on said carriage for moving said rack, movable means connected to said second motor for supporting a record having light-reflecting marks thereon, light-sensitive means for detecting said marks, and means including switches connecting said light-sensitive means and said motors for starting and stopping said motors alternately under the control of said records.

2. An apparatus for forming articles of a predetermined shape comprising a carriage movable along a straight path, a motor for moving said cariage, means movably mounted on said carriage for supporting a record having light-reflecting marks thereon, means for connecting said record supporting means to said motor for movement thereby, light-sensitive means for detecting said marks, a rack mounted on and projecting from opposite sides of said carriage for endwise movement at substantially a right angle to said straight path, means for forming an article connected to and movable with said rack, a second motor on said carriage for moving said rack, movable means connected to said second motor for supporting a record having light-reflecting marks thereon, light-sensitive means for detecting said marks, and means including switches connecting said light-sensitive means and said motors for starting and stopping said motors alternately under the control of said records.

3. An apparatus for forming articles of a predetermined shape comprising a shaping device, means for supporting said shaping device for movement along two right angularly related paths, a first reversible motor for moving said device along one path, a second reversible motor for moving said device along the other path, a first pair of record supporting members connected to and driven by said first motor, a second pair of record supporting members connected to and driven by said second motor, said records having light-reflecting marks and non-reflecting areas thereon, means for detecting the marks on one record of each of the pairs of records, means for detecting the marks on the other records of each pair, an electrical system connecting said detecting means and said motors, said system being responsive to the reflecting marks on said one of each pair of records for alternately starting and stopping said motors and said system being responsive to the reflecting marks on the other records of said pair for reversing the direction of said motors, and manually operable switching means in said system for reversing the direction of said motors in response to detection of the nonreflecting areas on said other of said records.

4. An apparatus for forming articles of a predetermined shape comprising a shaping device, means for supporting said device for movement along two substantial right angularly related paths, a reversible motor for moving said device along one path, a second reversible motor for moving said device along the other path, a first pair of drums connected to and rotated by said first motor, a second pair of drums connected to and rotated by said second motor, each of said drums being adapted to receive a record having light-reflecting marks thereon, means for detecting the marks on said cylinders, an electrical control system connecting the detecting means and said motors for starting said first motor and stopping said second motor in response to the detection of marks on one of said second pair of drums, and starting said second motor and stopping said first motor in response to the detection of marks on one of said first drums, said system further being responsive to marks on the other drums of said first and second pairs for reversing said motors, and switching means in said system for reversing connections in said system to cause at least one of said motors to operate in a reverse direction when a mark is not detected and to operate in a forward direction when a mark is detected on one of the records on said other drum.

5. An apparatus for forming articles of a desired shape, comprising a shaping device, means supporting said device for movement along two substantially right angularly related straight paths, a reversible motor for moving said device along one of said paths, a second reversible motor for moving the device along the other of said paths, first and second distance control drums connected to said first and second motors respectively, each of said drums being adapted to receive a record having control marks thereon, light-sensitive means for detecting the marks on the record on said first distance control drum to stop said first motor and start said second motor, light-sensitive means for detecting a mark on the record on said second control drum to stop said second motor and start said first motor, and means including a relay electrically connected to said motors for starting one of said motors when a mark is detected on the record on the drum connected to the other motor and a mark that has stopped said one motor is still being detected by said light-sensitive means.

6. An apparatus for forming articles of a desired shape comprising a shaping device, means for supporting said device for movement along substantially right angularly related paths, separate reversible motors for moving said device selectively along said paths, a first pair of rotary drums connected to and driven by one of said motors, a second pair of rotary drums connected to and driven by the other motor, said drums being adapted to receive control records having marks thereon, a light-sensitive device adjacent to each drum for detecting the marks on the records thereon, an electrical system connecting said light-sensitive devices, said motors and a source of power for starting, stopping and reversing said motors to cause the latter to drive said shaping device alternately along said right angularly related paths, and clutching and reversing mechanism between said drums and said motors responsive to the marks on the records on one drum of each pair for causing drums to rotate in one direction regardless of the direction of operation of said motors.

7. A device for shaping articles comprising a shaping element, a first reversible electric motor for moving said element along a straight path, a second reversible electric motor for moving said element along a second path at about a right angle to said first path, a first rotary member for receiving a first record chart having control marks thereon, a driving connection between said first motor and said first rotary member, a second rotary member for receiving a second record chart having control marks thereon, a driving connection between said second motor and said second rotary member, first light-sensitive means for scanning said first record chart, second light-sensitive means for scanning said second record chart, an electrical circuit connecting said first and second scanning means with said motors, said first scanning means operating to stop said first motor and start said second motor upon detection of a mark, said second scanning means operating to stop said second motor and start said first motor upon detection of a mark, means for interchanging said driving connections to cause said first motor to drive said second rotary member and cause said second motor to drive said first rotary member, and switching means for interchanging the connections in said electrical circuit to cause said first scanning means to stop second motor and start said first motor, and cause said second scanning means to stop said first motor and start said second motor.

8. A device for shaping articles comprising a shaping element, a first reversible electric motor for moving said element along a straight path, a second reversible electrical motor for moving said element along a second path at about a right angle to said first path, a first rotary member for receiving a first record chart having control marks thereon, a driving connection between said first motor and said first rotary member, a second rotary member for receiving a second record chart having control marks thereon, a driving connection between said second motor and said second rotary member, first light-sensitive means for scanning said first record chart, second light-sensitive means for scanning said second record chart, an electrical circuit connecting said first and second scanning means with said motors, said first scanning means operating to stop said first motor and start said second motor upon detection of a mark, said second scanning means operating to stop said second motor and start said first motor upon detection of a mark, means for interchanging said driving connections to cause said first motor to drive said second rotary member and cause said second motor to drive said first rotary member, switching means for interchanging the connections in said electrical circuit to cause said first scanning means to stop said second motor and start said first motor, and cause said second scanning means to stop said first motor and start said second motor, and second and third movable elements for receiving record charts for controlling the direction of said motors, said second and third elements being movable with said first and second elements, respectively.

9. A device for forming articles comprising a shaping element, means supporting said shaping element for movement along right angularly related paths, a pair of motors, a pair of movable members for receiving record charts, means for scanning said record charts for controlling the starting and stopping of said motors, and means connecting said motors to said shaping element and said movable members, said means including adjustable elements for equalizing play between each motor and the shaping device and the movable members driven by each motor.

10. A device for forming articles comprising a shaping element, means supporting said element for movement along a path, a motor for moving said element along said path, a rotatable control drum associated with said motor, driving connections between said motor and said control drum and between said motor and said shaping element, and means in at least one of said driving connections for varying the play in said one driving connection to equalize the play in said driving connections.

11. A device for forming articles comprising a shaping element, means supporting said element for movement along a path, a motor for moving said element along said path, a rotatable control drum associated with said motor, driving connections between said motor and said shaping element, said driving connections including relatively movable interfitting dogs for transmitting power, and means adjustable relatively to said dogs for regulating the extent of relative movement of said dogs to equalize the play in said driving connections.

12. A device for executing a desired pattern comprising a tool, means supporting said tool for movement along right angularly related paths, a pair of motors, a pair of movable members for receiving record charts having control marks thereon, means for scanning said record charts to detect said marks to control the energizing and deenergizing of said motors, means connecting said motors to said tool and to said movable members for driving the latter and moving said tool alternately along said right angularly related paths, and an adjustable inertia member connected to at least one of said motors to cause it to coast after deenergization to move a detected mark at least partially past the position at which it is detected.

13. A device for executing a desired pattern comprising a tool, means supporting said tool for movement along right angularly related paths, a pair of motors, movable members for receiving record charts having indicia marks thereon, means for scanning said record charts to detect said marks for controlling the starting and stopping of said motors, and means connecting said motors to said tool and said movable members, said means including a coupling having adjusting means to introduce a predetermined lost motion between each motor and the tool and the movable members driven by each motor.

WILLIAM S. TANDLER.
DAVID S. WALKER.

REFERENCES CITED

The following references are of record in the file of this patent:

UNITED STATES PATENTS

| Number | Name | Date |
|---|---|---|
| 283,350 | Leman | Aug. 14, 1883 |
| 1,068,721 | Whitford | July 29, 1913 |
| 1,172,058 | Scheyer | Feb. 15, 1916 |
| 1,172,059 | Scheyer | Feb. 15, 1916 |
| 1,544,655 | Krebs | July 7, 1925 |
| 1,759,857 | Krebs | May 27, 1930 |
| 2,107,396 | Schoitz | Feb. 8, 1938 |
| 2,279,338 | Oldham | Apr. 14, 1942 |
| 2,438,098 | Tandler and Walker | Mar. 16, 1948 |
| 2,477,041 | Bucknam | July 26, 1949 |